(12) United States Patent  
Lapke

(10) Patent No.: US 6,240,356 B1  
(45) Date of Patent: May 29, 2001

(54) WORK MACHINE SPEED CONTROL SYSTEM TO MANAGE ENGINE OVERSPEED AND BRAKE ENERGY

(75) Inventor: Robert A. Lapke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/219,960

(22) Filed: Dec. 23, 1998

(51) Int. Cl.$^7$ ................................................. B60K 41/20
(52) U.S. Cl. ............................ 701/93; 701/96; 701/102; 701/104
(58) Field of Search ............................ 701/93, 96, 102, 701/104, 107, 114; 73/112; 123/350; 340/439

(56) References Cited

U.S. PATENT DOCUMENTS

| | | | |
|---|---|---|---|
| 5,560,431 | * 10/1996 | Stratton | 172/2 |
| 5,731,761 | 3/1998 | Sychra | 340/689 |
| 6,030,314 | * 2/2000 | Brooks et al. | 477/92 |

* cited by examiner

*Primary Examiner*—William A. Cuchlinski, Jr.
*Assistant Examiner*—Marthe Marc-Coleman

(74) *Attorney, Agent, or Firm*—Haverstock, Garrett & Roberts

(57) ABSTRACT

A speed control system for controlling the ground speed or track speed of a particular work machine based upon the angle of inclination of the terrain upon which the work machine is operating, the present system including a first sensor for determining the angle of inclination of the terrain upon which the work machine is operating, a second sensor for determining the ground speed of the work machine, and an electronic controller coupled with the first and second sensors and with various speed retarding systems associated with the work machine for controlling the operation thereof so as to maintain the ground speed of the work machine below a predetermined maximum ground speed limit based upon the particular operating terrain angle of inclination. The controller will output a signal to one or more of the various ground speed retarding systems associated with the work machine when the controller receives a signal from the second sensor indicative of the ground speed of the work machine being equal to a predetermined ground speed. In certain situations, the controller may output a signal to the engine governor system to shutoff all fuel to the engine to further retard the ground speed of the machine. The controller may also output a signal to a monitoring or warning system so as to provide the machine operator with an overspeed warning signal in the operator compartment.

17 Claims, 2 Drawing Sheets

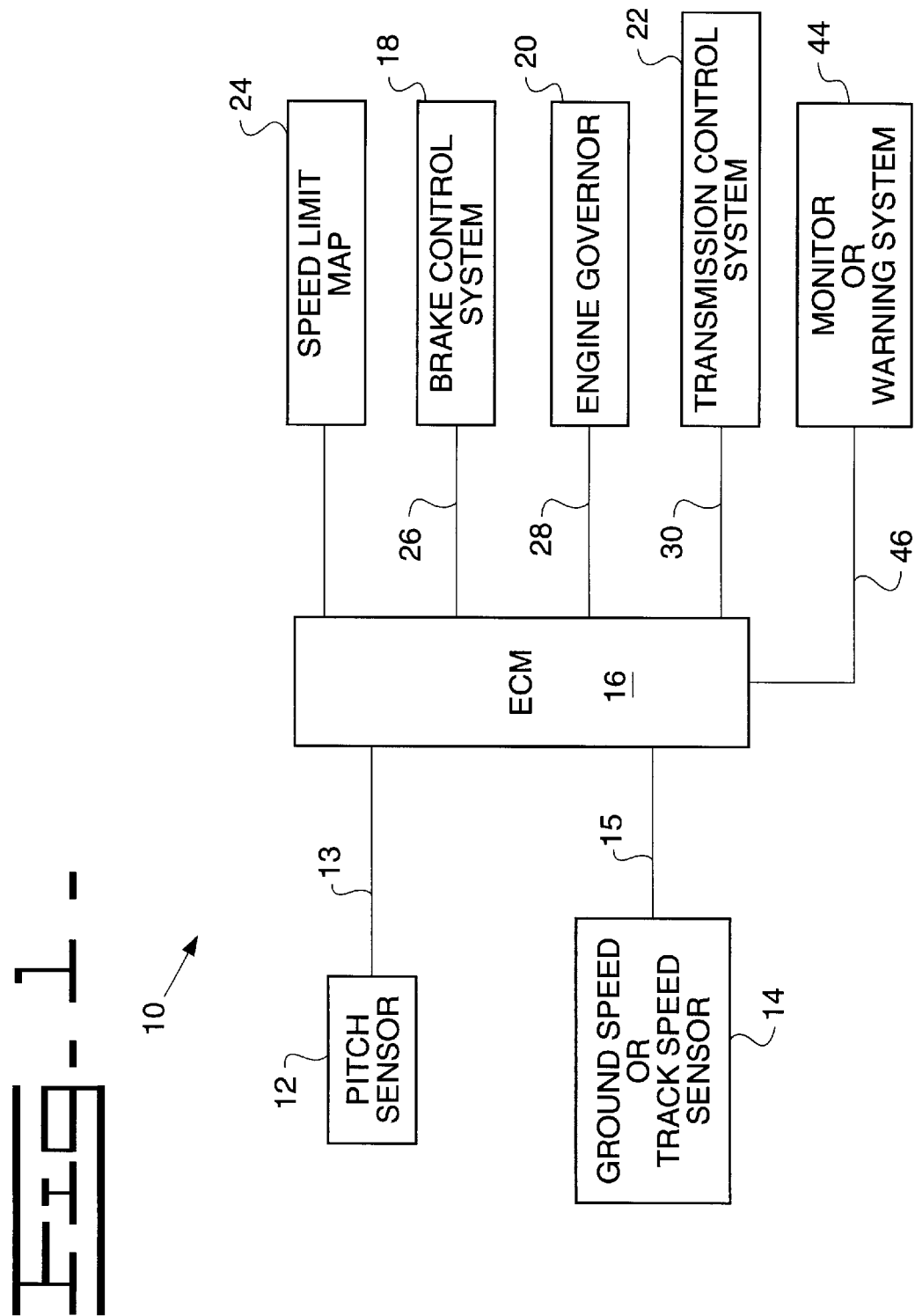

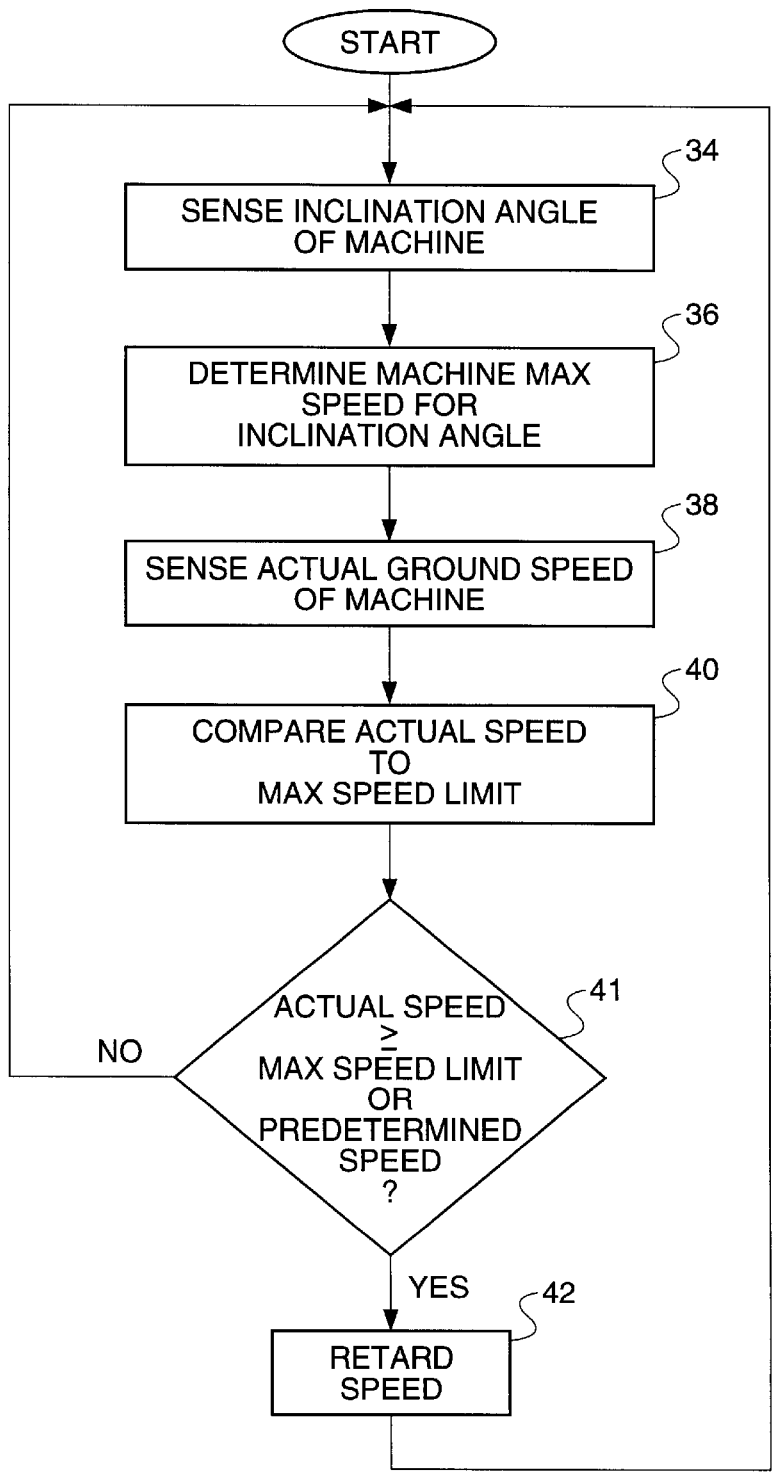

WORK MACHINE SPEED CONTROL SYSTEM TO MANAGE ENGINE OVERSPEED AND BRAKE ENERGY

TECHNICAL FIELD

This invention relates generally to control systems for monitoring engine speed and energy absorption capability and, more particularly, to a control system which controls and manages the maximum ground speed of a work machine based upon the degree of slope or inclination of the terrain upon which the work machine is operating.

BACKGROUND ART

Work machines such as track type tractors and a wide variety of other types of mining and earthmoving equipment often work in environments which give rise to speed control problems. For example, many different types of work machines are subject to potential engine and brake damage when operating on terrain which slopes, that is, when operating at various angles of inclination. Typically, any movement or pass on a slope where the work machine is not dozing, ripping, or performing other earthmoving type operations provides the opportunity for that particular work machine to be affected by gravity and to reach much faster speeds than it would normally reach under similar no load conditions on level terrain. In potential overspeed situations, the engine governor associated with some work machines may be controlled to respond to such a situation by shutting off fuel to the engine thereby retarding the ground speed of the machine. The engine is also capable of providing increased braking torque as the engine speed is driven higher due to the fact that the work machine is accelerating on the particular slope or inclination. Depending upon the particular work machine, there is some slope or inclination at which the weight of the work machine can drive the engine speed, or ground speed of the machine, beyond the speed capabilities of the particular work machine thereby resulting in damage or failure to the engine or power train system, typically, damage to the valve train. Also, as the terrain slope increases, the work machine achieves higher levels of kinetic energy which can be more difficult to dissipate depending upon the particular work and/or environmental conditions existing at the time.

Engine valve trains and brake systems can be developed to improve their overspeed and energy absorption capability. There are, however, economic and physical limitations to the amount of improvement which can be realistically achieved in these areas if a marketable product is to be produced.

It would therefore be desirable if there were provided a control system that would monitor the ground speed or engine speed of a particular work machine as it operates on an inclined surface and that would both manage and control the speed limit of the work machine based upon its operating slope or inclination. It would also be desirable if such a speed control system could also output appropriate signals to various speed retarding systems associated with a particular work machine to maintain the speed of the machine within proper operating speed limits while performing work on an inclined surface.

Accordingly, the present invention is directed to overcoming one or more of the problems as set forth above.

DISCLOSURE OF THE INVENTION

In accordance with the teachings of the present invention, an engine or work machine speed control system is disclosed wherein the attitude or inclination of the work machine is sensed and, based upon that particular slope or inclination, the control system determines the maximum ground speed or track speed of the work machine and monitors such ground speed so as to prevent the work machine from exceeding such maximum speed. In accordance with the operation of the present control system, the maximum speed limit of the work machine is directly related to the degree of slope or angle of inclination of the terrain upon which the work machine is operating. In this regard, the control system interfaces with an electronic control module (ECM) which outputs appropriate signals to other systems of the work machine to retard the ground speed of the work machine when the predetermined maximum speed limit for the particular slope of inclination is approached during operation conditions. For example, the present control system may output appropriate signals to the brake control system to modulate the brakes in order to assure that the maximum speed limit determined for that particular slope or inclination is not exceeded.

In another aspect of the present invention, the present control system will output appropriate signals to the engine governor to control the delivery of fuel to the engine and, if necessary, to shut off fuel to the engine, in order to maintain the ground speed of the work machine below the predetermined maximum speed limit.

Still further, in another aspect of the present invention, the present control system will output appropriate signals to the transmission control system so as to select and downshift the work machine into an appropriate gear that will again retard the ground speed of the machine so as to stay below the predetermined maximum speed limit.

The present control system therefore determines a maximum ground speed of the work machine based upon its operating slope or angle of inclination and thereafter outputs appropriate signals to appropriate retarding systems so as to maintain such ground speed below the predetermined maximum speed limit. The present system therefore allows the various systems and electronic control modules associated with the work machine to automatically control what a machine operator does today to properly manage machine speed and brake energy.

BRIEF DESCRIPTION OF THE DRAWINGS

For a better understanding of the present invention, reference may be made to the accompanying drawings in which:

FIG. 1 is a schematic diagram of a speed control system constructed in accordance with the teachings of one embodiment of the present invention; and FIG. 2 is a flow chart of the operating steps for a speed control system constructed in accordance with the teachings of one embodiment of the present invention.

BEST MODE FOR CARRYING OUT THE INVENTION

Referring to FIG. 1, numeral 10 in FIG. 1 represents one embodiment of a speed control system 10 that incorporates the principles of the present invention. The speed control system 10 includes a pitch or inclination sensor 12 and a ground speed or track speed sensor 14, both of which sensors provide input signals to an engine electronic control module (ECM) 16. Based upon the input signals from sensors 12 and 14, ECM 16 will control output signals to various systems of the work machine such as the brake control system 18, the engine governor 20 and the transmission control system 22. Output signals to the brake control system 18 and the transmission control system 22 will typically be directed to pilot solenoid valves, which are used in a conventional manner to control fluid flow to the respective systems. The brake control system 18, the transmission control system 22 and the engine governor 20 can all be utilized as retarding devices for maintaining the ground speed or track speed of the particular work machine below a predetermined maximum speed limit as will be hereinafter explained.

Electronic controllers or modules such as the ECM 16 are commonly used in association with work machines for controlling and accomplishing various functions and tasks including monitoring and controlling engine functions such as engine speed, engine load and fuel flow to the respective cylinders and fuel injectors associated with a particular engine. In this regard, an engine ECM such as ECM 16 is typically connected for delivering current control signals to devices such as fuel admission valves and fuel injectors for controlling fuel delivery to the engine. Such engines may also be driven through a torque converter. ECM 16 may also typically include processing means, such as a microcontroller or microprocessor, associated electronic circuitry such as input/output circuitry, analog circuits or programmed logic arrays, as well as associated memory.

A pitch or inclination sensor 12 is coupled to ECM 16 via conductive path 13 for constantly delivering pitch indicative signals to ECM 16 during the operation of the particular work machine. Pitch or inclination sensors or transducers are well known in the art and are commonly used to determine the role or pitch of a work machine. In this regard, the pitch sensor 12 may be similar to the type described in U.S. Pat. No. 5,731,761 issued to the assignee of the present application. Other suitable pitch or inclination sensors may likewise be utilized without departing from the spirit and scope of the present invention.

A ground speed sensor 14 is likewise coupled to ECM 16 via conductive path 15 for constantly delivering ground speed indicative signals to ECM 16 during the operation of the particular work machine. The ground speed sensor 14 continuously senses and monitors the particular ground speed of the work machine and provides such information to ECM 16 as will be hereinafter explained. Ground speed sensor 14 could, for example, take the form of a radar unit properly positioned on the work machine, the use of which is well known in the art. Use of a radar unit to measure ground speed is advantageous in that it gives a true indication of ground speed that is independent of other parameters. Nevertheless, other suitable speed measuring devices or sensors such as magnetic speed pickup sensors, Hall effect sensors and tachometers are likewise well known in the art and could likewise be utilized to determined the ground speed of the particular machine.

In the case of track type work machines such as track type loaders and tractors, it is recognized and anticipated that the track or belt speed may be sensed in lieu of the ground speed of the particular track type machine and such track speed may be correlated to a particular ground speed for the machine. For example, on these types of work machines, left and right drive motors typically control the speed at which the left and right tracks rotate in a fore and aft direction. Since the RPM of the respective right and left drive motors is directly related to the respective left and right track or belt speed of the machine, the sensor 14 could be passive type sensors commonly used in the industry wherein a sensing element is positioned and located to pulse and count the number of gear teeth passing in front of the element over a certain period of time and thereafter output signals indicative of the RPM of the respective drive motors. ECM 16 could then take the RPM speed of the left and right drive motors and convert such RPM speeds into the ground speed of the machine via look-up tables, a speed correlation map, or other algorithms or programming associated with ECM 16. Track speed could also be determined by utilizing appropriate converter and transmission output sensors wherein both the particular transmission gear selected and the converter output speed are utilized and correlated to determine track speed.

Within the memory of ECM 16 is stored a lookup table or map 24 of the work machine maximum ground speed limit based upon terrain slope angles. This map or table may be either a previously determined and stored nominal map of the relationship of the work machine ground speed relative to the slope of the terrain, or such map or table may be one that is calculated by ECM 16 based upon appropriate algorithms stored therein. The speed limit map 24 is directly related to the angle of inclination of the work machine and will typically include a plot of speed versus inclination or pitch relative to a substantially level or horizontal working surface.

Based upon inputs from sensors 12 and 14 and based upon the data stored within map 24, ECM 16 determines the maximum ground speed of the machine based upon the working angle of inclination and thereafter outputs appropriate signals to control the operation of the brake control system 18, the engine governor 20 and the transmission control system 22 in order to maintain the ground speed of the work machine below the maximum ground speed dictated by map 24. In this regard, ECM 16 is coupled to the brake control system 18 via conductive path 26; it is coupled to the engine governor via conductive path 28; and it is coupled to the transmission control system via conductive path 30. Still further, based upon inputs from sensors 12 and 14 and map 24, ECM 16 will use such data to control the braking system 18 by calculating the amount of braking energy required to keep the work machine below the predetermined maximum speed limit required for a particular slope angle; it will determine the proper gear in which the work machine should be operated in in order to restrict the ground speed thereof and, if necessary, automatically downshift the machine into such gear; and ECM 16 will output appropriate signals, if necessary, to the engine governor 20 via conductive path 28 to either reduce the delivery of fuel to the respective fuel injectors or, if necessary, shutoff fuel to the engine so as to assure that the maximum speed limit determined by map 24 for the particular operating angle of inclination is not exceeded.

Operating steps in accordance with one aspect of the present invention are set forth in flow chart 32 illustrated in FIG. 2. Such steps can be incorporated into the programming of the processing means of ECM 16 by techniques well known to those of ordinary skill in the art. The steps of flow chart 32 can be initiated while the work machine is operating on a slope or other terrain inclination, or such operating steps can be programmed to continuously run based upon some predetermined repeat interval or other criteria.

Once control loop 32 is initiated, the actual inclination angle of the work machine is sensed at step 34 by the pitch sensor 12 and this angle of inclination is then inputted and stored into the memory associated with ECM 16 via conductive path 13. At step 36, ECM 16 will read and determine the maximum speed limit of the particular work machine based upon the angle of inclination sensed by sensor 12 from the speed limit map 24. At step 38, the ground speed or track speed sensor 14 will measure the ground speed or track speed of the machine and input such information to ECM 16 via conductive path 15. At step 40, ECM 16 will compare the actual ground speed of the work machine to the maximum speed limit obtained from map 24. Based upon this comparison, ECM 16 will take appropriate action as set forth at step 41. For example, at step 41, if the actual ground speed or track speed of the work machine is less than the maximum speed limit determined from map 24, or less than some predetermined speed based upon the maximum speed limit determined from map 24, no retarding action is necessary to control the speed of the work machine at this particular time and ECM 16 will loop back to step 34 and repeat control loop 32.

If, on the other hand, at step 41, ECM 16 determines that the actual speed of the work machine is equal to or greater than the maximum speed limit established by map 24, or greater than some predetermined speed based upon the maximum speed limit determined from map 24, ECM 16 will output appropriate control signals at step 42 to either the brake control system 18, and/or engine governor 20, and/or the transmission control system 22 in order to reduce the ground speed of the work machine to a speed below the maximum predetermined speed limit. In reality, ECM 16, at step 41, will compare the actual ground speed of the work machine to the maximum speed limit determined from map 24 minus some predetermined incremental speed such that ECM 16 can output appropriate signals to the appropriate retarding systems 18, 20 and 22 as the ground speed of the machine approaches the maximum speed limit so as to prevent such ground speed from ever exceeding the maximum speed limit. In other words, ECM 16 will take appropriate action to retard the speed of the work machine at some predetermined speed less than the maximum speed limitation determined from map 24.

With respect to restricting or retarding the ground speed of the work machine at step 42, ECM 16 can output signals to any one or more of the systems 18, 20 and 22, in any order, in order to maintain the machine ground speed within proper limits. For example, when it is determined at step 41 that the actual ground speed is equal to or greater than, or approaching, the maximum speed limit established by map 24, ECM 16 will calculate, via appropriate algorithms, the amount of braking energy which must be applied to the machine in order to maintain the ground speed below the maximum speed limit by some predetermined incremental value. ECM 16 may thereafter output appropriate signals via conductive path 26 to the appropriate brake solenoids so as to apply or modulate the brakes so as to maintain the ground speed within proper limits. In this regard, the algorithms associated with ECM 16 may also take into account the rate of change of speed over time based upon sensing the actual ground speed of the work machine during previous successive iterations of flow chart 32. A rapid increase in the rate of change of the ground speed of the particular work machine would be indicative of an impending overspeed condition and such a rate increase could likewise be utilized as a triggering mechanism for ECM 16 to output appropriate signals to the retarding mechanisms 18, 20 and 22 so as to maintain the ground speed of the machine within proper limits.

In addition to modulating the brake control system to control engine or machine overspeed, ECM 16 can likewise output appropriate signals to the transmission control system 22 via conductive path 30 to appropriate transmission pilot solenoids to downshift the work machine into an appropriate gear which will likewise retard the machine's ground speed so as to control the same within proper operating limits. In this regard, ECM 16, through appropriate programming, can determine the appropriate gear to be selected to retard the machine's speed and thereafter send the appropriate commands to the transmission control system 22.

Still further, if necessary, based upon inputs from sensors 12 and 14 and map 24, ECM 16 can likewise output appropriate signals via conductive path 28 to the engine governor to either restrict the delivery of fuel to the appropriate fuel injectors, or even shutoff fuel altogether to such injectors, in order to maintain the ground speed of the machine below the maximum speed limit determined from map 24. Any combination of these commands outputted by ECM 16 via conductive paths 26, 28 and 30 can take place and occur based upon the particular operating conditions of the work machine and the inputs from sensors 12 and 14 and map 24.

It is also recognized and anticipated that ECM 16 could also output a warning signal to some type of monitoring or warning system 44 via conductive path 46 (FIG. 1) to the operator compartment of the work machine so as to advise the operator that the machine is either approaching or, in fact, is operating outside of defined normal limits of the speed map 24 and that corrective actions are being taken by the speed control system. This advisory warning to the operator of the work machine may further facilitate actions by the operator to manage and control the speed of the work machine within proper parameters. The warning signal 46 could activate some type of visual and/or audio warning signal in the operator compartment when ECM 16 outputs any one or more of the control signals 26, 28 and 30 to any of the speed retarding systems at step 42 of flow chart 32. When calculating the various engine performance parameters based upon sensors 12 and 14 and the speed map 24, ECM 16, through appropriate programming, will likewise compare the engine and converter speeds against the speed map 24 accounting for fuel injector position parasitic loads.

INDUSTRIAL APPLICABILITY

As described herein, the present speed control system 10 has particular utility in all types of work machines and other vehicles wherein management of engine or machine speed and/or brake energy is of concern. The present system monitors the speed control of the particular work machine, whether such speed is ground speed or track speed, and thereafter relates the work machine speed to the overspeed parameters associated with the particular slope of the terrain upon which the machine is operating. An inclination or pitch sensor 12 measures the angle of inclination of the work machine and ECM 16 utilizes such information to determine the maximum ground speed, or correlated maximum engine speed, associated with that particular work machine, for that particular operating slope or angle of inclination. Speed sensor 14 then inputs the current or actual ground speed or track speed of the work machine to ECM 16 and ECM 16 monitors such ground speed so as to prevent an overspeed situation. If necessary, ECM 16 will output appropriate signals to restrict and retard the work machine speed so as to maintain such speed within proper operating limits below the maximum speed limit previously determined.

In calculating the speed control and braking energy required by the particular work machine, ECM 16 will output appropriate signals and command the brake control system 18 to apply the proper amount of brake energy to maintain and control the machine speed within proper limits;

it will output appropriate signals and command the transmission control system 22 to select the proper gear and downshift the work machine to such gear so as to maintain and control the machine's speed within proper limits; and ECM 16 will output appropriate signals to the engine governor 20 so as to control fuel flow to the engine to likewise retard and control the machine's speed.

It is also recognized that variations to the operating steps depicted in flow chart 32 could be made without departing from the spirit and scope of the present invention. In particular, steps could be added or some steps could be eliminated. All such variations are intended to be covered by the present invention. Also, it is preferred that control loop 32 be repeated at a predetermined interval for at least as long as the work machine is operating on an inclined work surface. This predetermined interval can be based upon a specific predetermined period of time, predetermined incremental changes in ground speed or track speed, or some other parameter or other criteria. In addition, at step 42, ECM 16 can be programmed to either loop back to step 34 and repeat flow chart 32, or ECM 16 could terminate control loop 32 after step 42 and such control loop could be thereafter repeated based upon the predetermined repeat criteria for again triggering the operating steps of flow chart 32.

Other aspects, objects and advantages of the present invention can be obtained from a study of the drawings, the disclosure and the appended claims.

What is claimed is:

1. A control system for controlling the ground speed of a work machine wherein the work machine includes a brake control system for controlling such ground speed, said control system comprising:

a first sensor for determining the angle of inclination of the terrain upon which the work machine is operating;

a second sensor for determining the ground speed of the work machine; and an electronic controller coupled with said first and second sensors for receiving signals therefrom, said controller being operable to receive a signal from said first sensor indicative of the angle of inclination of the work machine, and a signal from said second sensor indicative of the ground speed of the work machine;

said controller being further coupled to the brake control system of the work machine for controlling the operation thereof, said controller being capable of outputting signals to the brake control system to retard the ground speed of the work machine; and memory means coupled to said controller and having stored therein maximum ground speed limits for the work machine based upon the angle of inclination of the terrain upon which such machine is operating;

said controller outputting a signal to the brake control system of the work machine to retard the ground speed of the work machine when said controller receives a signal from said first sensor indicative of the particular angle of inclination of the terrain upon which the work machine is operating, when said controller determines the maximum ground speed of the work machine based upon the signal received from said first sensor, and when said controller receives a signal from said second sensor indicative of the ground speed of the work machine being equal to a predetermined ground speed.

2. The control system, as set forth in claim 1, wherein said predetermined ground speed is equal to the maximum ground speed determined by said controller based upon the signal received from said first sensor.

3. The control system, as set forth in claim 1, wherein said predetermined ground speed is greater than the maximum ground speed determined by said controller based upon the signal received from said first sensor.

4. The control system, as set forth in claim 1, wherein said predetermined ground speed is less than the maximum ground speed determined by said controller based upon the signal received from said first sensor.

5. The control system, as set forth in claim 1, wherein said predetermined ground speed is within a predetermined range relative to the maximum ground speed determined by said controller based upon the signal received from said first sensor.

6. The control system, as set forth in claim 1, wherein the work machine includes a monitoring system for receiving signals from said electronic controller indicative of the ground speed of the work machine relative to the maximum ground speed determined by said controller based upon the signal received from said first sensor, said electronic controller outputting a signal to said monitoring system when said controller outputs a signal to the brake control system to retard the ground speed of the work machine.

7. The control system, as set forth in claim 1, wherein the work machine includes a transmission control system for controlling the particular transmission gear in which the work machine is operating;

said electronic controller being further coupled to the transmission control system and being capable of outputting signals to such transmission control system to control the particular gear in which the work machine is operating;

said controller outputting a signal to the transmission control system of the work machine to select and control the particular gear in which the work machine is operating when said controller receives a signal from said second sensor indicative of the ground speed being equal to said predetermined ground speed.

8. The control system, as set forth in claim 7, wherein said predetermined ground speed is equal to the maximum ground speed determined by said controller based upon the signal received from said first sensor.

9. The control system, as set forth in claim 7, wherein said predetermined ground speed is greater than the maximum ground speed determined by said controller based upon the signal received from said first sensor.

10. The control system, as set forth in claim 7, wherein said predetermined ground speed is less than the maximum ground speed determined by said controller based upon the signal received from said first sensor.

11. The control system, as set forth in claim 7, wherein said predetermined ground speed is within a predetermined range relative to the maximum ground speed determined by said controller based upon the signal received from said first sensor.

12. The control system, as set forth in claim 1, wherein the work machine includes an engine governor system for controlling the delivery of fuel to the engine of the work machine;

said electronic controller being further coupled to the engine governor system and being capable of outputting signals to such engine governor system to control the amount of fuel being delivered to the engine;

said controller outputting a signal to the engine governor system of the work machine to decrease the amount of fuel being delivered to the engine when said controller receives a signal from said second sensor indicative of the ground speed being equal to said predetermined ground speed.

13. The control system, as set forth in claim 12, wherein said predetermined ground speed is equal to the maximum ground speed determined by said controller based upon the signal received from said first sensor.

14. The control system, as set forth in claim 12, wherein said predetermined ground speed is greater than the maximum ground speed determined by said controller based upon the signal received from said first sensor.

15. The control system, as set forth in claim 12, wherein said predetermined ground speed is less than the maximum ground speed determined by said controller based upon the signal received from said first sensor.

16. The control system, as set forth in claim 12, wherein said predetermined ground speed is within a predetermined range relative to the maximum ground speed determined by said controller based upon the signal received from said first sensor.

17. The control system, as set forth in claim 12, wherein said controller outputs a signal to the engine governor system of the work machine to shutoff all fuel to the engine.

* * * * *